Nov. 30, 1948.  C. R. WILSON  2,455,105
COUPLING PIN STRUCTURE
Filed Aug. 17, 1946

Inventor
Charles R. Wilson.

By Clarence A. O'Brien
and Harvey B. Jacobson
Attorneys

Patented Nov. 30, 1948

2,455,105

UNITED STATES PATENT OFFICE 2,455,105

COUPLING PIN STRUCTURE

Charles R. Wilson, Road Fork, Ky., assignor of one-half to C. B. Varney, Road Fork, Ky.

Application August 17, 1946, Serial No. 691,308

2 Claims. (Cl. 280—33.15)

This invention relates to new and useful improvements and structural refinements in coupling pins, more specifically, in coupling pin structures, such as are usually employed in association with coupling bars, or yokes, on commercial vehicles, including trailers, mining cars, and the like.

The principal object of the invention is to provide a device of the character herein described, in which safety means is incorporated to prevent the coupling pin from becoming accidentally or unintentionally disengaged from the coupling yoke.

A further object of the invention is to provide a coupling pin structure which may be readily engaged or disengaged by manipulating a conveniently positioned handle.

Another object of the invention is to provide a coupling pin structure which is simple in construction and operation and which cannot easily become damaged.

An additional object of the invention is to provide a coupling pin structure which will readily lend itself to economical manufacture.

With the above more important objects in view and such other objects as may become apparent as this specification proceeds, the invention consists essentially of the construction and arrangement of parts as shown in the accompanying drawings in which.

Like characters of reference are used to designate like parts in the specification and throughout the several views.

Figure 1:
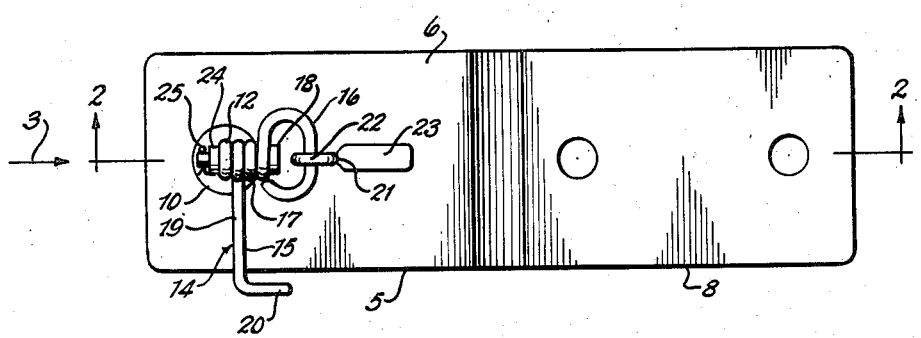
Figure 1 is a top plan view of the invention.

Referring now to the accompanying drawings in detail, the invention embodies in its construction a coupling yoke 5, which may assume any desired form, such as is exemplified in the drawings by a pair of spaced members 6, 7, secured together in a substantially parallel relationship, with the member 7 being extended as at 8, in order to provide a bolting plate, so to speak, whereby the yoke may be suitably secured to a vehicle.

The members 6 and 7 are formed with a pair of aligned apertures 9, and a coupling pin 10 is removably receivable in these apertures, as will be clearly apparent from the accompanying drawings. The pin 10 is provided at one end thereof with an angular shoulder 11 terminating in a substantially flat head 12, this in turn, being formed with a transversely extending aperture 13.

The essence of the invention resides in the provision of a safety device designated generally by the reference character 14, the same consisting of a one piece wire-like rod 15, arcuated at one end thereof to form an elongated eye 16. A portion of the rod 15 adjacent the eye is wound in a helical formation as at 17 around a pivot bolt 18, hereinafter to be more fully described. The remaining portion of the rod 15 extends outwardly to provide an arm 19, this in turn, terminating in an angulated handle 20.

A further wire-like rod 21 is arcuated to form an inverted U-shaped portion or hook 22, one arm of which is extended to provide a laterally offset, flattened portion 23. The latter is welded or otherwise suitably secured to the upper surface of the aforementioned member 6, as will be clearly apparent from the accompanying drawings.

The aforementioned pivot bolt 18 is rotatably positioned in the aperture 13 of the pin 10, and a suitable nut 24 and a cotter pin 25 are employed for retaining the bolt in position. It will be noted that in this manner, the rod 15 as a whole, is pivotally connected to the pin 10.

Figure 2:
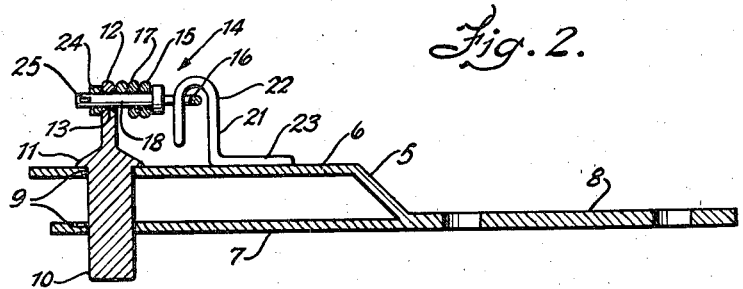
Figure 2 is a cross sectional view thereof, the same being taken substantially in the plane of the line 2—2 in Figure 1.
Figure 3:
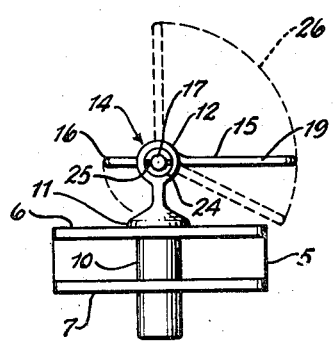
Figure 3 is an end view, taken in the direction of the arrow 3 in Figure 1.

When the invention is placed in use, the eye 16 normally engages the hook 22, as is best shown in Figures 1 and 2. By virtue of this engagement, the pin 10 will be effectively prevented from being accidentally withdrawn from the apertures 9, thus safeguarding against unintentional disconnection of the couplings.

The coupling is disconnected by simply raising the handle 20 upwardly in the direction of the arrow 26, thus disengaging the eye 16 from the hook 22. The pin 10, together with the rod 15 and the bolt 18, may then be readily withdrawn from the coupling yoke.

It is believed that the advantages and use of the invention will be clearly understood from the foregoing disclosure and accordingly, further description thereof at this point is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

1. In association with a coupling yoke, a coupling pin structure comprising in combination, a pin removably engaging said yoke and having a transversely extending aperture formed adjacent one end thereof, a pivot bolt removably positioned in said aperture, a one piece wire-like rod arcuated at one end thereof to form an elongated eye, a portion of said rod adjacent said eye being wound in a helical formation around said bolt, the remaining portion of said rod forming an arm, and being angulated adjacent the free end thereof to provide a handle, and an inverted hook secured to said yoke, said eye being engageable with said hook upon the manipulation of said handle.

2. The device as defined in claim 1 in which said yoke comprises a pair of spaced members provided with a pair of axially aligned openings, said pin being removably receivable in said openings.

CHARLES R. WILSON.

REFERENCES CITED

The following references are of record in the file of this patent:

UNITED STATES PATENTS

| Number | Name | Date |
|---|---|---|
| 870,177 | Hurd | Nov. 5, 1907 |
| 2,339,155 | Cusack | Jan. 11, 1944 |

FOREIGN PATENTS

| Number | Country | Date |
|---|---|---|
| 332,311 | Great Britain | July 24, 1930 |
| 457,655 | Germany | Mar. 21, 1928 |